(12) United States Patent
Zwart et al.

(10) Patent No.: US 8,331,300 B2
(45) Date of Patent: Dec. 11, 2012

(54) METHOD FOR COMMUNICATING DATA, A TRANSMITTING UNIT AND A COMPUTER PROGRAM PRODUCT

(75) Inventors: Willem Zwart, Assendelft (NL); Dignus-Jan Moelker, Voorhout (NL)

(73) Assignee: Wireless Audio IP B.V., Amsterdam (NL)

( * ) Notice: Subject to any disclaimer, the term of this patent is extended or adjusted under 35 U.S.C. 154(b) by 338 days.

(21) Appl. No.: 12/600,179

(22) PCT Filed: May 14, 2007

(86) PCT No.: PCT/NL2007/050208
§ 371 (c)(1),
(2), (4) Date: Feb. 9, 2010

(87) PCT Pub. No.: WO2008/140294
PCT Pub. Date: Nov. 20, 2008

(65) Prior Publication Data
US 2010/0150066 A1 Jun. 17, 2010

(51) Int. Cl.
*H04W 4/00* (2009.01)
(52) U.S. Cl. .......................... 370/329; 455/450; 455/455
(58) Field of Classification Search .......... 370/310–350; 455/450–460
See application file for complete search history.

(56) References Cited

U.S. PATENT DOCUMENTS

| 5,940,399 | A | 8/1999 | Weizman |
| 2002/0071449 | A1* | 6/2002 | Ho et al. ...................... 370/447 |
| 2002/0163933 | A1* | 11/2002 | Benveniste .................. 370/465 |
| 2003/0086437 | A1 | 5/2003 | Benveniste |
| 2004/0071154 | A1 | 4/2004 | Wentink |
| 2004/0261101 | A1 | 12/2004 | Iwamura |
| 2006/0083166 | A9* | 4/2006 | Janczak ...................... 370/230 |

FOREIGN PATENT DOCUMENTS

| CN | 1905473 A | 1/2007 |
| JP | 2000-209221 A | 7/2000 |
| JP | 2003-032266 A | 1/2003 |
| JP | 2004-260266 A | 9/2004 |
| JP | 2005-012275 A | 1/2005 |
| JP | 2006-050519 A | 2/2006 |
| JP | 2006-528437 A | 12/2006 |
| WO | WO 2005/071897 A1 | 8/2005 |

OTHER PUBLICATIONS

International Search Report for PCT/NL2007/050208 dated Feb. 13, 2008.

* cited by examiner

*Primary Examiner* — Charles C Jiang
(74) *Attorney, Agent, or Firm* — Leydig, Voit & Mayer, Ltd.

(57) ABSTRACT

The invention relates to a method for communicating data via a shared wifeless channel. The method comprises the steps of preparing a data packet for transmission via the shared wireless channel (10); detecting any signal presence in the channel (20); and transmitting the data packet if no signal has been detected in the detecting step C60). Further, the method comprises the step of transmitting the data packet if transmission requirements related to the data packet are met, irrespective of any signal detection in the detecting step (30,26).

12 Claims, 6 Drawing Sheets

METHOD FOR COMMUNICATING DATA, A TRANSMITTING UNIT AND A COMPUTER PROGRAM PRODUCT

FIELD OF THE INVENTION

The invention relates to a method for communicating data via a shared wireless channel comprising the steps of:
preparing a data packet for transmission via the shared wireless channel;
detecting any signal presence in the channel; and
transmitting the data packet if no signal has been detected in the detecting step.

BACKGROUND

Such a data a communication method is known as a contention based access protocol, wherein transmitting data packets is released after detection that no signals are present in the wireless channel. In the case of any detected signal presence, transmission of the data packet is postponed to a predetermined later instant. At the later predetermined instant the detecting step is repeated and the data packet is transmitted if the channel is free of detected signals. Otherwise, the process is repeated again at a further later instant.

In practice, many devices might send signals in the shared wireless channel, such as radar equipment, microwave ovens, cordless phones, Bluetooth applications, wireless computer networks, etc.

If many devices sharing the wireless channel use the channel for sending data packets during a relatively busy time period, the chance increases that a particular device detects a signal in the channel, thereby reducing the chance that a particular signal can be transmitted after only a few iterations of the detecting step. Further, a particular device might be trapped in an indefinite waiting loop. For real time applications, such as real time low-latency audio and/or video applications, such effects might induce undesired quality loss of signals, such as drop-outs and/or stottering.

Further, contention free protocols are known defining scheduled time slots allowing specific devices to transmit data packets satisfying predefined characteristics into a shared wireless channel.

SUMMARY OF THE INVENTION

It is an object of the invention to provide a method according to the preamble, wherein the disadvantages identified above are reduced. In particular, the invention aims at obtaining a method according to the preamble wherein a better control with respect to transmission requirements of particular signals is obtained. Thereto the method according to the invention further comprises the step of transmitting the data packet if transmission requirements related to the data packet are met, irrespective of any signal detection in the detecting step.

By transmitting the data packet if transmission requirements related to the data packet are met, irrespective of any signal detection in the detecting step, a hybrid protocol is obtained having both contention based access features as well as scheduled based access features that are advantageous for signals having specific transmission requirements.

The invention is partly based on the insight that in some cases no interference of transmitted data packets occur due to the fact that a transmission of a first data packet which has been detected by a device sharing the wireless channel, may have been completed before the device actually starts transmitting the second data packet. Further, though data packets are transmitted simultaneously, receipt quality of a particular data packet might be acceptable, e.g. if the signal to noise ratio of the relevant data packet is large enough, if the relevant data packet has a larger bandwidth than another data packet, if other data packets are temporally modulated to other frequencies, e.g. in Bluetooth applications, and/or if the temporal overlap between the relevant data packet and one or more other data packets is relatively small. By transmitting according to the invention the data packet, although a signal has been detected in the shared wireless channel, significant chances exist that a reasonable receipt quality is obtained, so that transmission requirements of particular signals can be met.

It is noted that the transmission requirements related to the data packet might comprise a maximum latency constraint, thereby enforcing real-time data specifications of signals. As a consequence, control over a maximum latency of a specific signal is obtained, thus meeting real-time requirements of systems, such as low-latency audio and/or video applications. In principle, the transmission requirements related to the data packet might further or alternatively comprise other specifications, such as a required noise level to be met in the shared channel.

Other advantageous embodiments according to the invention are described in the following claims.

The invention also relates to a transmitting unit for communicating data via a shared wireless channel.

Further, the invention relates to a computer program product.

BRIEF DESCRIPTION OF THE DRAWINGS

By way of example only, embodiments of the present invention will now be described with reference to the accompanying figures in which.

It is noted that the figures show merely preferred embodiments according to the invention. In the figures, the same reference numbers refer to equal or corresponding parts.

DETAILED DESCRIPTION OF THE DRAWINGS

Figure 1:
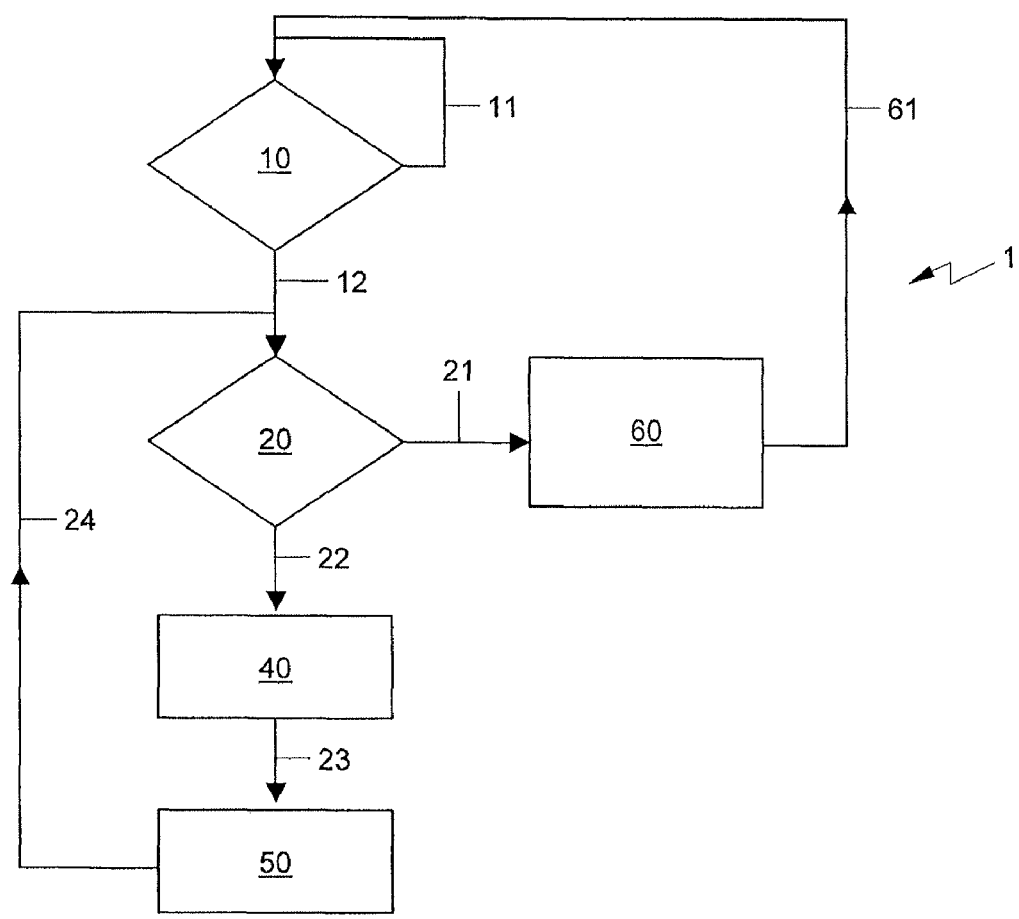
FIG. 1 shows a flow chart of a prior art method.

FIG. 1 shows a flow chart 1 of a prior art method for communicating data via a shared wireless channel. The method reflects a contention based access protocol.

In a first state 10, a system that operates according to the prior art method checks whether a data packet has to be sent into a shared wireless channel. If this is not the case, the system remains in the same state via arrow 11. If this is the case, the data packet is prepared for transmission via the shared wireless channel, e.g. by storing the data packet in a buffer, and a second state 20 is entered via arrow 12. In the second state it is detected whether a signal is present in the channel. If this is the case, the data packet will be transmitted in a third state 60 which is entered via arrow 21. After sending the data packet, the system returns to the first state 10 via arrow 61.

Figure 2A:
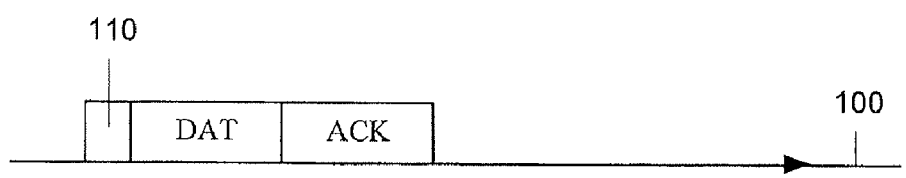
FIG. 2a shows a signal sequence in a shared wireless channel using the prior art method in a first situation.

FIG. 2a shows a signal sequence in a shared wireless channel using the prior art method in a first situation as described above. Following the time line 100, a detecting period 110, also called a clear channel assessment, is reserved for detecting whether any signal is present in the shared wireless channel. Then, a data packet DAT is transmitted followed by an acknowledgement signal ACK transmitted by a receiving device receiving the data packet DAT via the channel.

Returning to FIG. 1, if in the second state a signal presence in the channel is detected, the system performing the prior art method enters via arrow 22 a fourth state 40 wherein a waiting time is computed, also called back-off time. Then, the system enters via arrow 23 a fifth state 50 wherein the system waits the waiting time before entering the second state 20 again via arrow 24. In the case no signal is detected anymore in the channel, the data packet is transmitted.

Figure 2B:
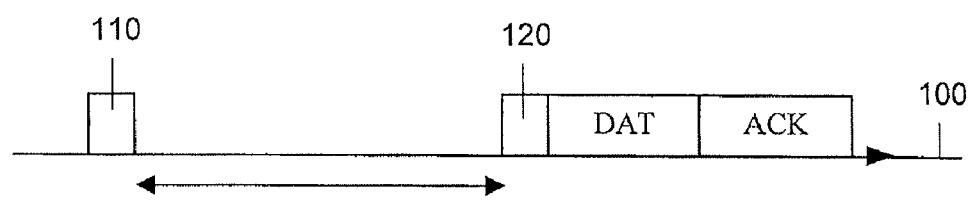
FIG. 2b shows a signal sequence in a shared wireless channel using the prior art method in a first situation.

FIG. 2b shows a signal sequence in a shared wireless channel using the prior art method in a second situation wherein a busy channel is detected. In this process, the data packet DAT is transmitted after a first detection period 110, a waiting time 130, and a second detection period 120.

Figure 3:
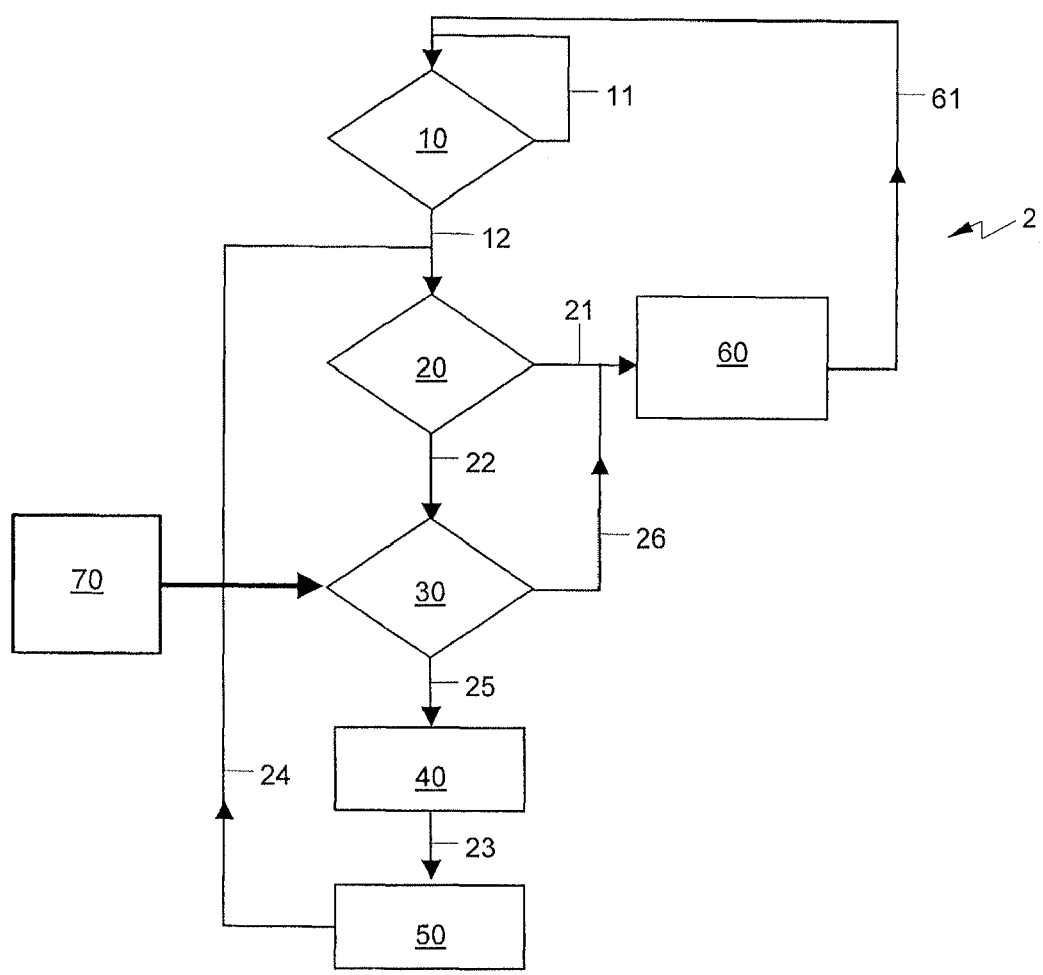
FIG. 3 shows a flow chart of an embodiment of a method according to the invention.

In FIG. 3 a flow chart of an embodiment of a method according to the invention is shown. Herein, a new, sixth state 30 is introduced that is entered via arrow 22 after a signal is detected in the second state 20. In the sixth state 30, it is checked whether transmission requirements related to the prepared data packet are met. The transmission requirements are symbolically depicted by a box 70 that inputs the data in a system that is implemented for performing the method according to the invention. If the requirements are met, the data packet is transmitted in the third state 60 which is entered via arrow 26. A signal sequence as shown in FIG. 2a is obtained. Otherwise, if the requirement is not met, a waiting time is computed in the fourth state, as indicated above. Then, a signal sequence as shown in FIG. 2b can be obtained.

The transmission requirements related to the prepared data packet comprise e.g. a maximum latency constraint or other dynamic temporal behaviour, e.g. in relation with other delayed data packets.

In a preferred embodiment according to the invention, the method further comprises preparing a plurality of data packets for transmission via the shared wireless channel and wherein in the transmitting step the plurality of data packets is transmitted, instead of a single data packet.

Figure 4:
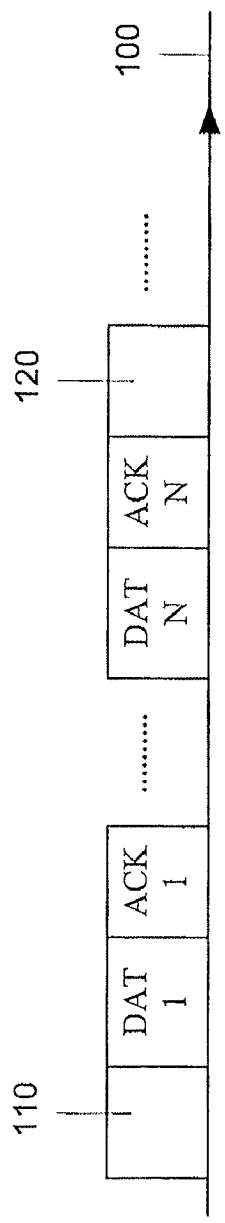
FIG. 4 shows a first signal sequence in a shared wireless channel using the method of FIG. 3.

FIG. 4 shows a first signal sequence in a shared wireless channel using the method according to the invention wherein a plurality of data packets DAT 1-DAT N, also called a data frame, is transmitted after a single detection period or clear channel assessment 110. After transmission of a data packet DAT 1, DAT 2, . . . , DAT N, a corresponding acknowledgement signal ACK 1, ACK 2, . . . , ACK N is transmitted by a receiving device, thus indicating that the data packet has been received in good order. By transmitting a multiple number of data packets after a single detection period 110, a reduced number of detection periods 110 is employed, thereby reducing overhead in the shared wireless channel.

In principle, after transmitting a data packet a time slot can be scheduled for transmitting another acknowledgement type signal, e.g. a not acknowledgement signal that the data packet is not received in good order by the receiver. However, if receipt of data signals is not correct, the shared wireless channel is regularly filled with not acknowledgement signals indicating the same, thereby reducing a chance that a data packet is transmitted correctly. Therefore, application of acknowledgement signals is preferred in the protocol described in relation with FIG. 4.

Figure 5:
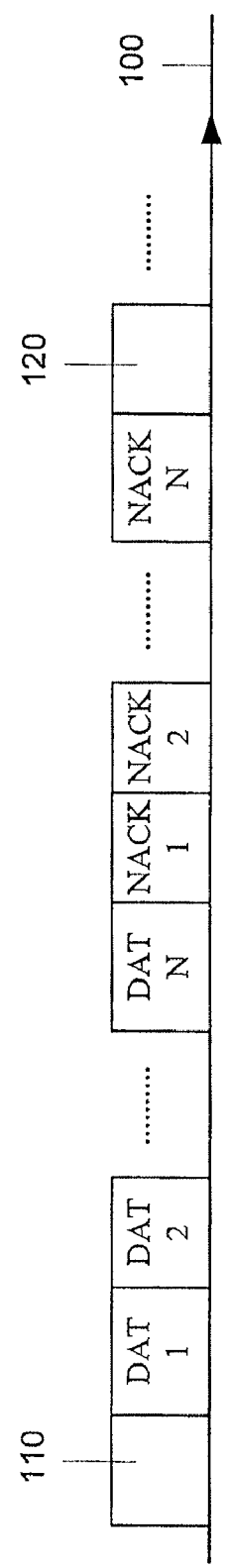
FIG. 5 shows a second signal sequence in a shared wireless channel using the method of FIG. 3.

In an alternative embodiment according to the invention, a plurality of data packets is transmitted, followed by a plurality of time slots scheduled for transmitting an acknowledgement type signal by a device receiving a data packet. The thus obtained sequence is depicted in FIG. 5 showing a second signal sequence in a shared wireless channel using the method according to the invention. Again, in principle, time slots for either an acknowledgement signal ACK or a not acknowledgement signal NACK can be scheduled. By choosing a protocol implementing not acknowledgement signals NACK a back-off silence period is relatively long, thereby reducing interference problems and improving the efficiency of the protocol.

Figure 6:
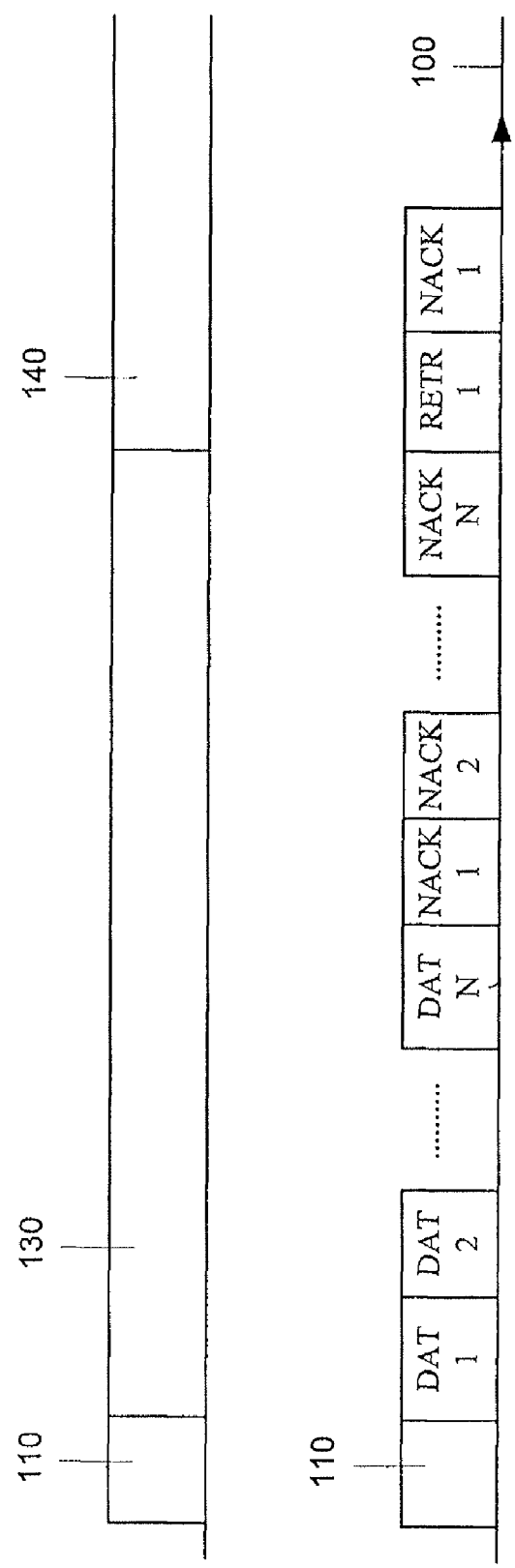
FIG. 6 shows a third signal sequence in a shared wireless channel using the method of FIG. 3.

FIG. 6 shows a third signal sequence in a shared wireless channel using a third embodiment of the method according to the invention. Here, a fixed allocation time slot 130 implemented as shown in FIG. 6. Then, a time slot 140 is scheduled for repeated transmission of at least one data packet RETR 1 optionally followed by an acknowledgment signal ACK or NACK. The time slot 140 for repeated transmission can be flexible and in dependence of any presence of NACK signal in the fixed time slot 130.

It is noted that the fixed allocation time slot 130 in FIG. 6 can also be implemented otherwise, e.g. according to another above-described time slot schedule, e.g. according to the signal sequence shown in FIG. 4.

By waiting a waiting time after a signal has been detected in the shared wireless channel, another device that actively sends signals in the channel can terminate its data packet transmission without being interrupted by the transmission of the data packet that has been prepared for transmission.

The step of computing a waiting time may comprise determining the number of detecting steps that already has been performed to check whether the channel is free. As an example, the waiting time can be computed as an exponential function of said subsequent detecting steps.

In an advantageous embodiment according to the invention, the transmission requirements related to the data packet comprise a transmission priority depending on a data packet type. Thus, as an example, a detected signal that is detected in the detecting step can be classified in a priority category. As a next step, the data packet is transmitted depending on a relative priority of the detected signal and the data packet, respectively. According to the invention, transmission of the data packet can be performed if the data packet is given a higher priority than the priority of the detected signal. Otherwise, if the priority of the detected signal is higher than the data packet priority, it might be decided to not transmit the data packet and to wait.

Further, as an alternative to preparing a single data packet for transmission, a multiple number of data packets can be prepared, e.g. in a series of memory buffers. Different transmission priorities can be assigned to the multiple number of prepared data packets, e.g. based on their data packet type. As an example, different transmission priorities can be assigned to audio data, video data and computer data, respectively. Transmission priorities can also be assigned based on additional or alternative data packet information, such as the amount of data. As a next step a particular data packet can be selected based on transmission priorities assigned to each of the multiple number of data packets. Then the selected data packet is determined to be the first data packet to be transmitted. After transmission of the selected data packet, the selection step can be performed again and/or a new data packet can be prepared for transmission.

Figure 7:
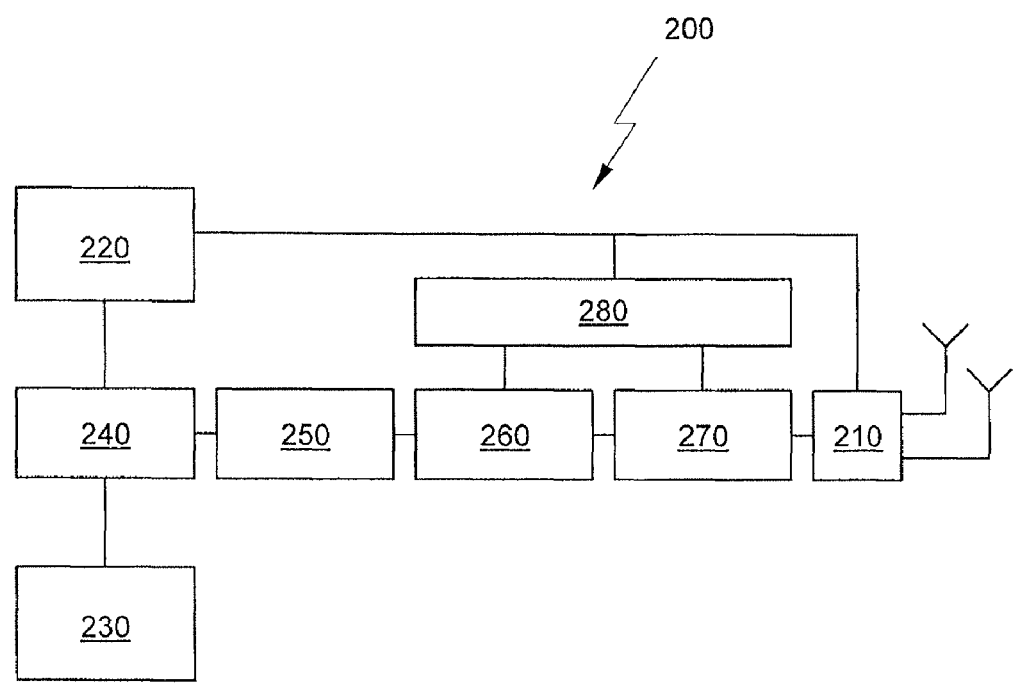
FIG. 7 shows a transmitting unit according to the invention.

FIG. 7 shows a transmitting unit 200 according to the invention. The transmitting unit 200 comprises a transmitting element 210 and a processor 220 that is arranged for performing steps according to the invention described above, such as preparing the data packet, detecting any signal presence in the channel, causing the transmitting element 210 to transmit the data packet if no signal has been detected and/or causing the transmitting element 210 to transmit the data packet if transmission requirements related to the data packet are met, irrespective of any signal detection in the detecting step. In order to execute the whole process, the transmitting unit further comprises an analog audio input port 230, an audio decoder 240, an audio buffer 250, a framing unit 260 for constructing a data packet frame, a digital modem 270 and configuration registers 280 for configuring the framing unit 250 and the digital modem 270.

The method according to the invention can at least partly be implemented in application software. However, the method according to the invention can also at least partly be implemented in hardware, such as ASIC, FPGA or DSP components.

The invention is not restricted to the embodiments described herein. It will be understood that many variants are possible.

As an example, the packet size of the data packets can be optimized for a typical data transmission situation in the shared wireless channel.

Other such variants will be obvious for the person skilled in the art and are considered to lie within the scope of the invention as formulated in the following claims.

The invention claimed is:

1. A method for communicating data via a shared wireless channel comprising the steps of:
    preparing a data packet for transmission via the shared wireless channel;
    detecting a signal presence in the shared wireless channel;
    transmitting the data packet if no signal is detected in the detecting step; and
    transmitting the data packet if transmission requirements related to the data packet are met, irrespective of any signal detection in the detecting step;
    wherein the transmission requirements related to the data packet comprise a maximum latency constraint.

2. The method according to claim 1, further comprising:
    preparing a plurality of data packets for transmission via the shared wireless channel, and
    wherein in the transmitting step the plurality of data packets is transmitted.

3. The method according to claim 1, wherein after transmitting a data packet, a time slot is scheduled for transmitting an acknowledgement type signal by at least one device receiving the data packet.

4. The method according to claim 1, wherein after transmitting the plurality of data packets, a plurality of time slots is scheduled for transmitting an acknowledgement type signal by a device receiving a data packet from the plurality of data packets.

5. The method according to claim 1, wherein after transmitting one or more data packets a time slot is scheduled for repeated transmission of at least one data packet.

6. The method according to claim 1, further comprising the steps of:
    waiting a waiting time; and
    repeating the detecting step if a signal is detected in the detecting step.

7. The method according to claim 1, further comprising computing a waiting time, the waiting time depending on previous waiting times.

8. The method according to claim 1, wherein the transmission requirements related to the data packet comprise a transmission priority depending on a data packet type.

9. The method according to claim 1, wherein a detected signal that is detected in the detecting step is classified in a priority category, and
    wherein the data packet is transmitted depending on a relative priority of the detected signal and the data packet, respectively.

10. The method according to claim 1, further comprising the steps of:
    preparing a multiple number of data packets for transmission via the shared wireless channel;
    selecting a particular data packet from the multiple number of data packets based on transmission priorities assigned to each of the multiple number of data packets; and
    transmitting the particular data packet selected during the selecting step.

11. A transmitting unit for communicating data via a shared wireless channel, the transmitting unit comprising:
    a transmitting element arranged for transmitting a data packet via the shared wireless channel; and
    a processor arranged for performing the steps of:
        preparing a data packet for transmission via the shared wireless channel;
        detecting a signal presence in the shared wireless channel;
        causing the transmitting element to transmit the data packet if no signal is detected in the detecting step; and
        causing the transmitting element to transmit the data packet if transmission requirements related to the data packet are met, irrespective of any signal detection in the detecting step;
    wherein the transmission requirements related to the data packet comprise a maximum latency constraint.

12. A non-transitory computer-readable medium having computer-executable instructions for communicating data via a shared wireless channel stored thereon, the computer-executable instructions for causing a processor to perform the steps of:
    preparing a data packet for transmission via the shared wireless channel;
    detecting a signal presence in the shared wireless channel;
    transmitting the data packet if no signal is detected in the detecting step; and
    transmitting the data packet if transmission requirements related to the data packet are met, irrespective of any signal detection in the detecting step;
    wherein the transmission requirements related to the data packet comprise a maximum latency constraint.

* * * * *